(12) United States Patent
Jung et al.

(10) Patent No.: US 11,673,254 B2
(45) Date of Patent: Jun. 13, 2023

(54) PORTER MODULE AND ROBOT HAVING THE SAME

(71) Applicant: LG ELECTRONICS INC., Seoul (KR)

(72) Inventors: Chungin Jung, Seoul (KR); Sunho Yang, Seoul (KR); Eulpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 760 days.

(21) Appl. No.: 16/628,124

(22) PCT Filed: Jan. 2, 2019

(86) PCT No.: PCT/KR2019/000045
§ 371 (c)(1),
(2) Date: Jan. 2, 2020

(87) PCT Pub. No.: WO2020/141623
PCT Pub. Date: Jul. 9, 2020

(65) Prior Publication Data
US 2021/0154828 A1 May 27, 2021

(51) Int. Cl.
*B25J 13/08* (2006.01)
*B25J 9/00* (2006.01)
*B25J 9/08* (2006.01)
*B25J 9/10* (2006.01)
*B25J 11/00* (2006.01)

(52) U.S. Cl.
CPC .............. *B25J 9/0009* (2013.01); *B25J 9/08* (2013.01); *B25J 9/109* (2013.01); *B25J 11/008* (2013.01); *B25J 13/085* (2013.01)

(58) Field of Classification Search
CPC ......... B25J 9/0009; B25J 11/008; B25J 9/109
See application file for complete search history.

(56) References Cited

U.S. PATENT DOCUMENTS

2017/0300060 A1   10/2017   Crawley

FOREIGN PATENT DOCUMENTS

| CN | 108638032 A | * | 10/2018 | |
|---|---|---|---|---|
| CN | 108856622 A | * | 11/2018 | ............ B21J 13/085 |
| CN | 108942866 A | | 12/2018 | |
| KR | 10-2007-0014965 A | | 2/2007 | |
| KR | 10-2009-0121019 A | | 11/2009 | |
| KR | 20170134838 A | * | 11/2009 | |
| KR | 10-2017-0134838 A | | 12/2017 | |

OTHER PUBLICATIONS

Kim. "Splashing design, captivating customers—'LG Chloe' shipping robot", Jul. 26, 2018, pp. 1-3, https://social.lge.co.kr/technology/design_story07/, with English translation.

* cited by examiner

*Primary Examiner* — Randell J Krug
(74) *Attorney, Agent, or Firm* — Birch, Stewart, Kolasch & Birch, LLP

(57) ABSTRACT

A porter module includes: a main body having a space formed between a left body and a right body spaced apart from each other in a left-right direction; a left pressing body disposed on the left body; a right pressing body disposed on the right body and disposed to face the left pressing body; and an adjusting mechanism installed in the main body and moving at least one of the left pressing body and the right pressing body to adjust an interval between the left pressing body and the right pressing body.

18 Claims, 13 Drawing Sheets

PORTER MODULE AND ROBOT HAVING THE SAME

CROSS REFERENCE TO RELATED APPLICATIONS

This application is the National Phase of PCT International Application No. PCT/KR2019/000045, filed on Jan. 2, 2019 in the Republic of Korea, the contents of which are hereby expressly incorporated by reference into the present application.

TECHNICAL FIELD

The present invention relates to a porter module and a robot having the same.

BACKGROUND ART

Robots have been developed for industrial use to play a portion in factory automation. Recently, applications of robots have increasingly been expanded and robots that may be used in daily life, as well as medical robots and aerospace robots, have also been developed.

These robots for everyday use provide specific services (e.g., shopping, serving, talking, cleaning, etc.) in response to a user's command.

However, existing robots for everyday use are designed to provide only specific services, and thus utilization of the robots against cost invested for the development of the robots is not high.

Therefore, a necessity for a robot that may provide various services has recently emerged.

DISCLOSURE

Technical Problem

An object of the present invention is to provide a porter module capable of stably supporting and transporting baggage, and a robot having the same.

Another object of the present invention is to provide a porter module capable of minimizing damage of baggage when the baggage is moved, as well as minimizing damage to other articles by the baggage, and a robot having the same.

Technical Solution

An embodiment of the present invention may include a porter module, and the porter module includes: a main body having a space formed between a left body and a right body spaced apart from each other in a left-right direction; a left pressing body disposed on the left body; a right pressing body disposed on the right body and disposed to face the left pressing body; and an adjusting mechanism installed in the main body and moving at least one of the left pressing body and the right pressing body to adjust an interval between the left pressing body and the right pressing body.

The adjusting mechanism may include: a motor installed in the main body; and a cam disposed to be in contact with the left pressing body or the right pressing body and rotated by the motor.

At least one of the left pressing body and the right pressing body may further include: an outer contactor in contact with baggage between the left pressing body and the right pressing body; an inner body coupled to the outer contactor; a ball in contact with the cam; and a ball housing coupled to the inner body and rotatably accommodating the ball.

The main body may have a guide rod, and at least one of the left pressing body and the right pressing body may have a guide hole guided along the guide rod.

The adjusting mechanism may further include a puller which pulls one of the left pressing body and the right pressing body in a direction away from the other, and the puller may be installed in the main body and may be connected to the left pressing body or the right pressing body.

The main body may include: an inner cover forming the space and allowing the left pressing body and the right pressing body to be movably disposed thereon; and an outer cover surrounding the inner cover, and an accommodation space S2 accommodating the adjusting mechanism may be provided between the inner cover and the outer cover.

The adjusting mechanism may include: a left adjusting mechanism installed on the left body and moving the left pressing body so that the left pressing body advances toward to the right pressing body; and a right adjusting mechanism installed on the right body and moving the right pressing body so that the right pressing body advances toward the left pressing body.

Each of the left adjusting mechanism and the right adjusting mechanism may include a motor and a cam connected to the motor.

Each of the left pressing body and the right pressing body may include an outer contactor and an inner body coupled with the outer contactor. Each of the left pressing body and the right pressing body may further include a ball in contact with the cam and a ball housing coupled to the inner body so that the ball is rotatably accommodated therein.

The main body may include a left inner cover having a left opening through which the left pressing body penetrates and a right inner cover having a right opening through which the right pressing body penetrates.

The main body may include a left outer cover covering the left adjusting mechanism; and a right outer cover covering the right adjusting mechanism, wherein the left adjusting mechanism may be disposed between the left pressing body and the left outer cover and the right adjusting mechanism may be disposed between the right pressing body and the right outer cover.

The main body may include a left guide rod and a right guide rod, the left pressing body may have a left guide hole guided along the left guide rod, and the right pressing body may have a right guide hole guided along the right guide rod.

The adjusting mechanism may include: a left puller connected to the left pressing body and pulling the left pressing body in a direction away from the right pressing body; and a right puller connected to the right pressing body and pulling the right pressing body in a direction away from the left pressing body.

An embodiment of the present invention may include a robot having a porter module, and the robot having a porter module may include: a porter module; and a moving module.

The moving module may include a module support plate on which the porter module is mounted and a display unit higher than the module support plate.

The robot having a porter module may include a controller controlling the adjusting mechanism.

The robot having a porter module may include at least one sensor for sensing baggage placed between left and right pressing bodies. The controller may control the adjusting mechanism according to a signal transmitted from the at least one sensor.

The robot having a porter module may include a touch sensor. The touch sensor may be installed in the display unit or in the main body. The controller may control the adjusting mechanism according to a signal transmitted from the touch sensor.

The robot having a porter module may further include: a weight sensor sensing a weight of baggage; and a distance sensor sensing a distance to the baggage. The controller may control the adjusting mechanism according to the weight of the baggage and the distance to the baggage.

Advantageous Effect

According to the embodiment of the present invention, since baggage accommodated in space is pressed by the left pressing body and the right pressing body between the left pressing body and the right pressing body, the baggage may be carried in a state of being disposed to be short in a left-right direction and long in a front-rear direction and may be carried as safe as possible, while collision thereof with someone else or another article that is present around a transport path is minimized, and inconvenience to someone else may be minimized while the baggage is being carried.

Further, since the baggage is supported by an external force applied from each of the left pressing body and the right pressing body, the baggage may be reliably fixed in each of four directions, i.e., a forward direction, a backward direction, a leftward direction, and a rightward direction.

Further, since the adjusting mechanism linearly moves at least one of the left pressing body and the right pressing body by the motor and the cam, the left pressing body and the right pressing body may reliably be moved in a direction toward each other, the cam may reliably push out the left pressing body and the right pressing body although the baggage is heavy, and damage to the adjusting mechanism may be minimized.

Also, since the outer contactor or the inner body are not in direct contact with the cam and receives an external force through the ball and the ball housing, wear of or damage to the outer contactor or the inner body, which may occur if the outer contactor or the inner body are in direct contact with the cam, may be minimized and the porter module may have a long life.

Since the left pressing body or the right pressing body is linearly moved along the guide rod, sagging or wobbling of the left pressing body or the right pressing body may be minimized when the left pressing body or the right pressing body is moved, the left pressing body or the right pressing body may stably be in close contact with the baggage and reliably press the baggage.

Also, since the left pressing body or the right pressing body may be returned to an initial position by the puller, fastening of the baggage by the left pressing body or the right pressing body may be quickly released and the user may quickly take out baggage from the porter module.

In addition, the adjusting mechanism may be accommodated between the inner cover and the outer cover and protected by the inner cover and the outer cover.

In addition, since the left pressing body is moved in the rightward direction to press baggage and the right pressing body is moved in the leftward direction to press the baggage, the baggage is not inclined to one of the left and right sides and may be in close contact with each of the left pressing body and the right pressing body at the center of space, and the baggage may be more stably carried than a case where the baggage is inclined to one of the left and right sides of the space.

Also, the left adjusting mechanism may be easily serviced by separating the left outer cover, and the right adjusting mechanism may be easily serviced by separating the right outer cover.

MODE FOR INVENTION

Hereinafter, embodiments of the present invention will be described in detail with reference to the drawings.

Figure 1:
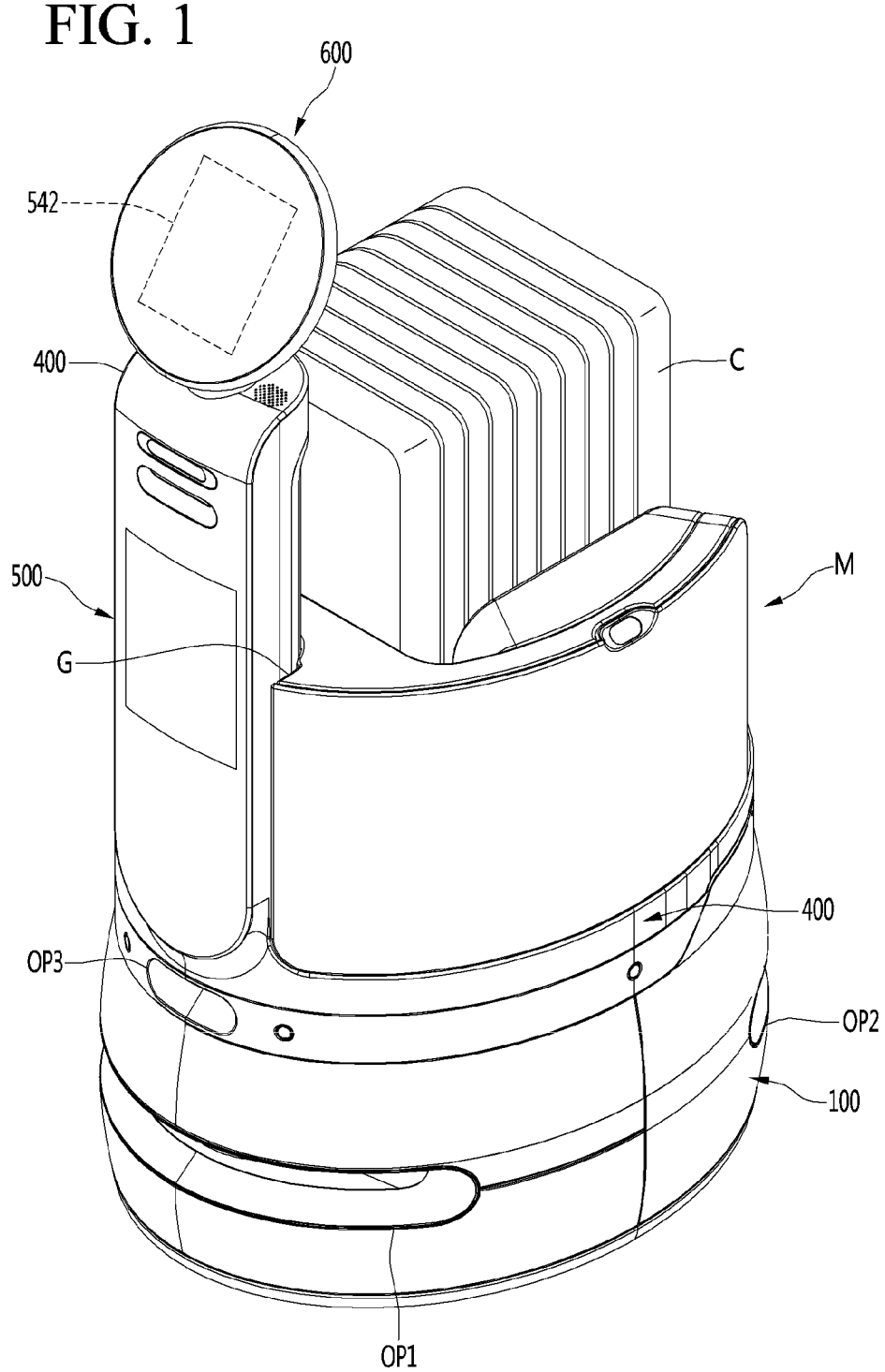
FIG. 1 is a perspective view illustrating a porter module and a robot having the same according to an embodiment of the present invention.
Figure 2:
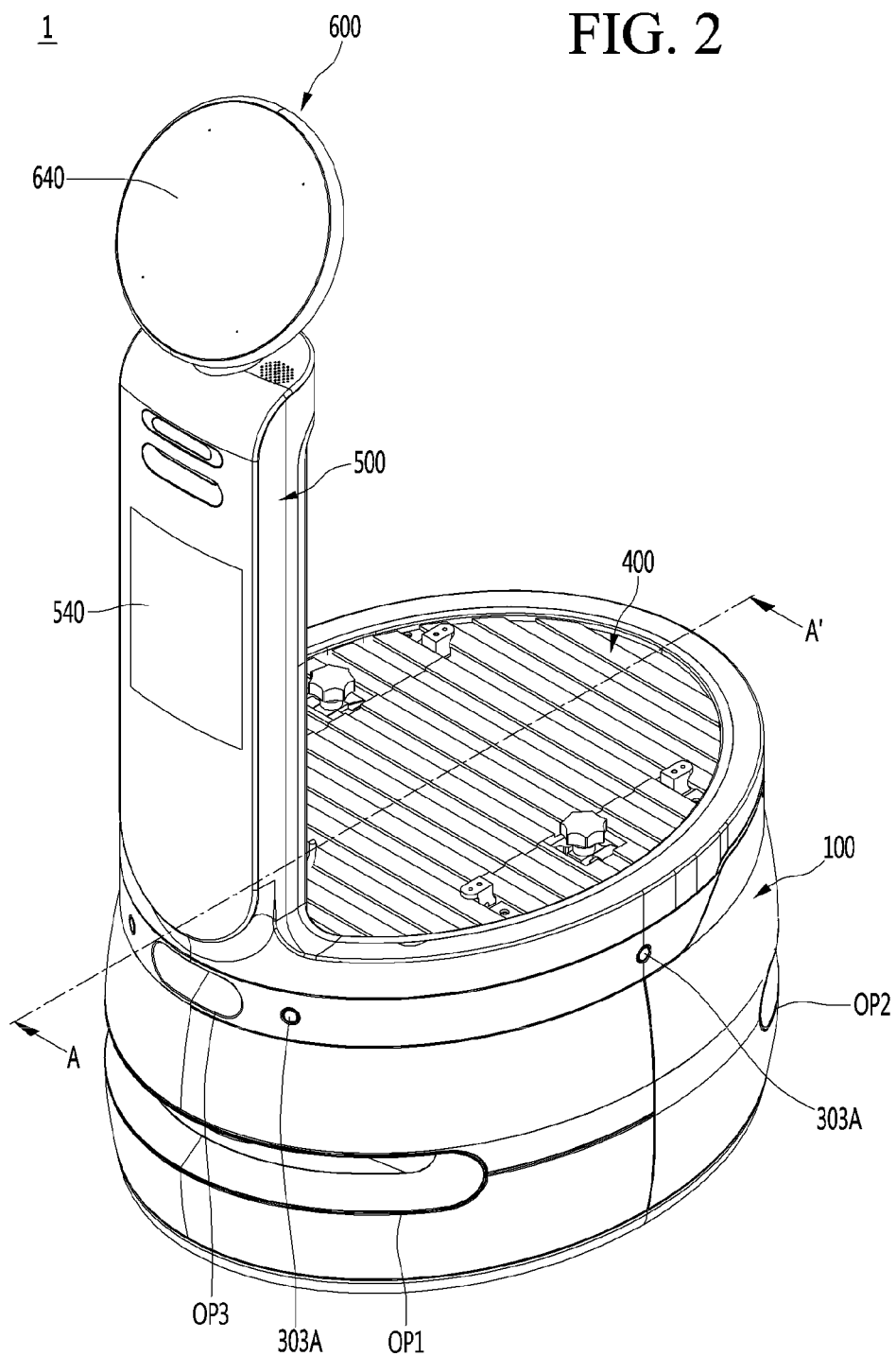
FIG. 2 is a perspective view of a moving module shown in FIG. 1.
Figure 3:
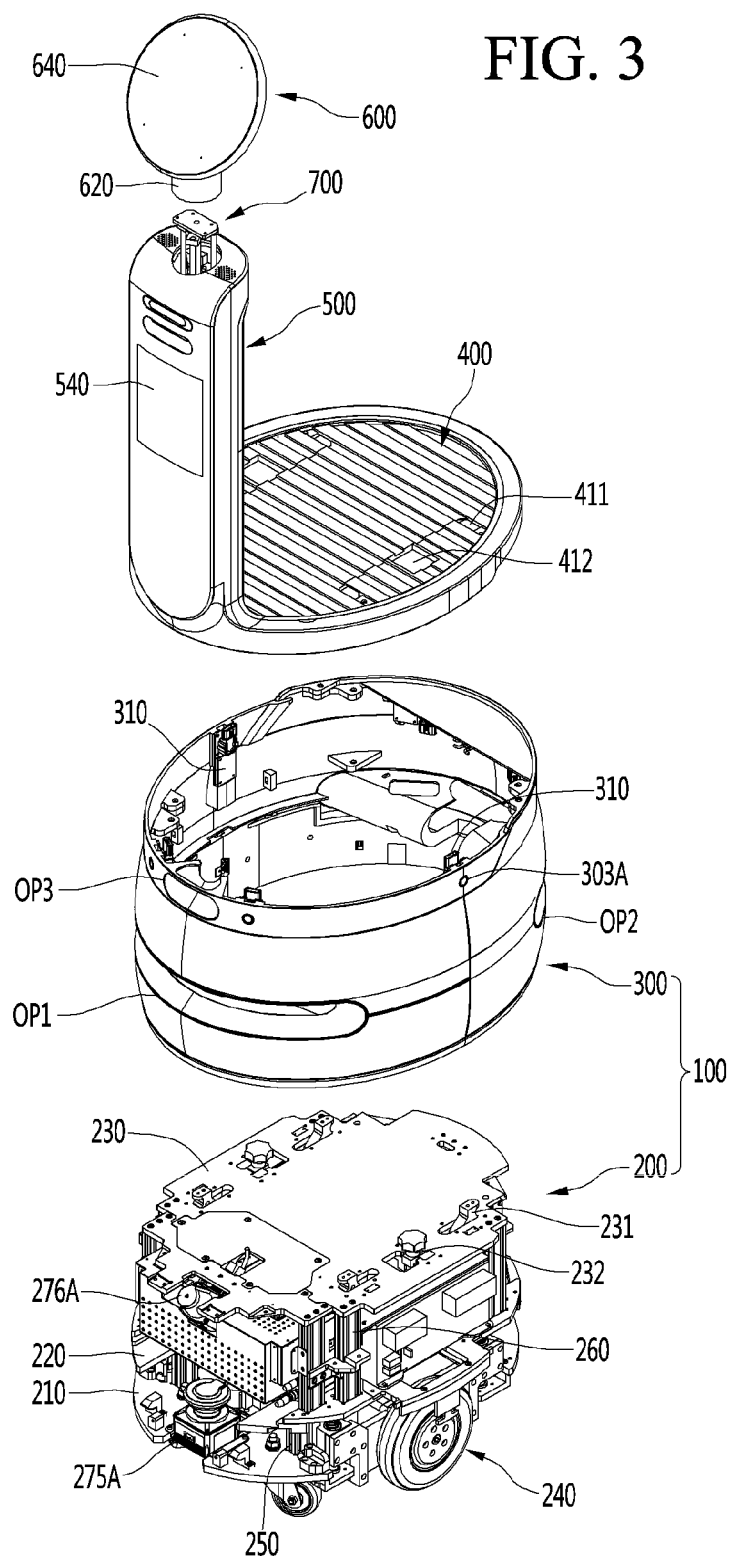
FIG. 3 is an exploded perspective view of the moving module shown in FIG. 2.

FIG. 1 is a perspective view of a porter module and a robot having the same according to an embodiment of the present invention, FIG. 2 is a perspective view of a moving module shown in FIG. 1, and FIG. 3 is an exploded perspective view of the moving module shown in FIG. 2.

A porter module M of the present embodiment may be a module for carrying (or transporting) an article C (e.g., baggage) at a hotel, resort, airport, etc., and the porter module M may support the article such that the article does not wobble.

An example of the porter module M may be configured separately from the moving module 1 and may be detachably coupled to a moving module 1.

The porter module M may be mounted on the moving module 1, and may be moved together with the moving module 1 when the moving module 1 moves.

When the porter module M is coupled to the moving module 1, a combination of the porter module M and the moving module 1 may be a robot, and such a robot may be a porter robot or a service robot that provides a transport service of articles (i.e., goods or items).

An example of the robot may be a robot that carries an article C in an accommodation such as a hotel, resort, etc. Such a robot may perform a guide service to guide a user to a room or a check-in service or a check-out service.

Another example of a robot may carry article C at a transportation facility such as an airport, a bus terminal, a train station or a subway station, and such a robot may perform a guide service for guiding the user to a boarding position. The robot may provide a ticketing service or the like.

The robot may be used in various fields, without being limited to a kind thereof, as long as it is a facility in which a service for carrying the article C (hereinafter, referred to as a transport service) is provided.

Hereinafter, the moving module 1 will be described first, and then the serving module M will be described.

The moving module 1 may include a body 100, a traveling unit 240, a module support plate 400, display units 500 and 600, and a rotation mechanism 700.

The body 100 may constitute a body of the moving module 1.

A length of the body 100 in a front-rear direction may be longer than a width of the body 100 in a left-right direction. For example, a horizontal section of the body 100 may have a substantially elliptical shape.

The body 100 may include an inner module 200 and a housing 300 surrounding the inner module 200.

The inner module 200 may be disposed inside the housing 300. The traveling unit 240 may be provided on a lower portion of the inner module 200.

The inner module 200 may include a plurality of plates and a plurality of frames. In more detail, the inner module 200 may include a lower plate 210, an upper plate 220 disposed above the lower plate 210, and a top plate 230 disposed above the upper plate 220. In addition, the inner module 200 may further include a plurality of lower supporting frames 250 and a plurality of upper supporting frames 260.

The lower plate 210 may constitute a bottom surface of the body 100. The lower plate 210 may be referred to as a base plate. The lower plate 210 may be horizontal. The lower plate 210 may be provided with the traveling unit 240.

The upper plate 220 may be spaced upward from the lower plate 210. The upper plate 220 may be referred to as a middle plate. The upper plate 220 may be horizontal. The upper plate 220 may be disposed between the lower plate 210 and the top plate 230 in a vertical direction.

The lower supporting frame 250 may be disposed between the lower plate 210 and the upper plate 220. The lower supporting frame 250 may extend vertically. The lower supporting frame 250 may support the upper plate 220 from a bottom of the upper plate 220.

The top plate 230 may constitute a top surface of the body 100. The top plate 230 may be spaced upward from the upper plate 220.

The upper supporting frame 260 may be disposed between the upper plate 220 and the top plate 230. The upper supporting frame 260 may extend vertically. The upper supporting frame 260 may support the top plate 230 from a bottom of the top plate 230.

The housing 300 may constitute an outer circumferential surface of the body 100. The housing 300 may be formed therein with a space in which the inner module 200 is disposed. The housing 300 may have an open top and an open bottom.

The housing 300 may surround edges of the lower plate 210, the upper plate 220, and the top plate 230. In this case, an inner circumference of the housing 300 may make contact with the edges of the lower plate 210, the upper plate 220, and the top plate 230, but the embodiment is not limited thereto.

The housing 300 may have a plurality of openings 303A. In more detail, the openings 303A may be formed in an upper portion of the housing 300. The openings 303A may be spaced apart from each other in a circumferential direction of the housing 300. An ultrasonic sensor 310 may detect an object around the moving module 1 through the openings 303A of the housing 300.

The housing 300 may include a material having a first thermal conductivity, and the inner module 200 may include a material having a second thermal conductivity which is higher than the first thermal conductivity. In more detail, at least one of the lower plate 210, the upper plate 220, the top plate 230, the lower supporting frame 250, or the upper supporting frame 260 may include a material having the second thermal conductivity which is higher than the first thermal conductivity.

For example, the housing 300 may include an injection plastic material, and at least one of the lower plate 210, the upper plate 220, the top plate 230, the lower supporting frame 250, or the upper supporting frame 260 may include a metal material such as aluminum.

Accordingly, while heat is smoothly dissipated from a heat generating component disposed on the inner module 200 through conduction, the housing 300 constitute an exterior of the body 100 may be prevented from becoming hot.

The traveling unit 240 may allow the moving module 1 to travel. The traveling unit 240 may be provided on a lower portion of the body 100. In more detail, the traveling unit 240 may be provided on the lower plate 210.

Meanwhile, the module support plate 400 may be mounted on the top surface of the body 100. The module support plate 400 preferably has a horizontal plate shape, but the embodiment is not limited thereto.

Similar to the body 100, a length of the module support plate 400 in the front-rear direction may be longer than a width of the module support plate 400 in the left-right direction.

The module support plate 400 may support the serving module M from a bottom of the serving module M. In other words, the serving module M may be seated and supported by the module support plate 400.

The serving module M may be detachably mounted on the module support plate 300.

The serving module M may be a conveyance target object conveyed by the moving module 1, and types of the serving module M are not limited. Therefore, there is an advantage that different serving modules M can be mounted on the same moving module 1 for use.

On the top surface of the body 100, that is, on the top plate 230, at least one of at least one module guide 231 configured to guide an installation position of the serving module M or at least one module fastening portion 232 fastened to the serving module M may be provided.

The module guide 231 and the module fastening portion 232 may protrude upward from the top plate 230.

The module guide 231 may pass through a sub-through-hole 411 formed in the module support plate 400, guide the installation position of the serving module M, and simultaneously prevent the serving module M from being shaken in a horizontal direction.

The module fastening portion 232 may pass through a sub-open hole 412 formed in the module support plate 400, and may be fastened to the serving module M. Therefore, the serving module M may be firmly mounted on a top of the module support plate 400.

In addition, the module guide 231 and the module fastening portion 232 may be utilized as a handle when the moving module 1 is conveyed.

The display units 500 and 600 may be disposed on an upper front side of the body 100. The display units 500 and 600 may extend vertically.

The display units 500 and 600 may include a body display unit 500 and a head display unit 600.

The body display unit 500 may be integrally formed with the module support plate 400. In this case, the body display unit 500 may extend upward from a front end of the module support plate 400. However, the body display unit 500 and the module support plate 400 may be formed as separate members.

A height of the body display unit 500 may be higher than a height of the body 100.

The body display unit 500 may include a body display 540 provided on a front surface of the body display unit 500. The body display 540 may serve as an output unit configured to display an image or a video. At the same time, the body display 540 may include a touch screen to function as an input unit configured to receive a touch input.

The body display unit 500 may be disposed on a front side of the serving module M mounted on the module support plate 400. In this case, a recess portion corresponding to a shape of the body display unit 500 may be formed in a front portion of the serving module M, and the body display unit 500 may be fitted into the recess portion. In other words, the body display unit 500 may guide a mounting position of the serving module M.

The head display unit 600 may be disposed above the body display unit 500. The head display unit 600 may be rotatably connected to an upper portion of the body display unit 500.

In more detail, the head display unit 600 may include a neck housing 620 rotatably connected to the body display unit 500. The rotation mechanism 700 may pass through an inside of the neck housing 620 to rotate the head display unit 600.

The head display unit 600 may include a head display 640 provided on the front side. The head display 600 may face a front side or an upper front side. The head display 640 may display an image or a video that describes a facial expression of a human. Accordingly, the user may receive an impression that the head display unit 600 is similar to a human head.

The head display unit 600 may rotate right and left about a vertical rotation axis within a predetermined range (e.g., 180 degrees) similarly to the human head.

The rotation mechanism 700 may rotate the head display unit 600 with respect to the body display unit 500. The rotation mechanism 700 may include a rotary motor and a rotation shaft rotated by the rotary motor. The rotary motor may be disposed inside the body display unit 500, and the rotation shaft may extend from an inside of the body display unit 500 into the neck housing 620 and may be connected to the head display unit 600.

Figure 4:
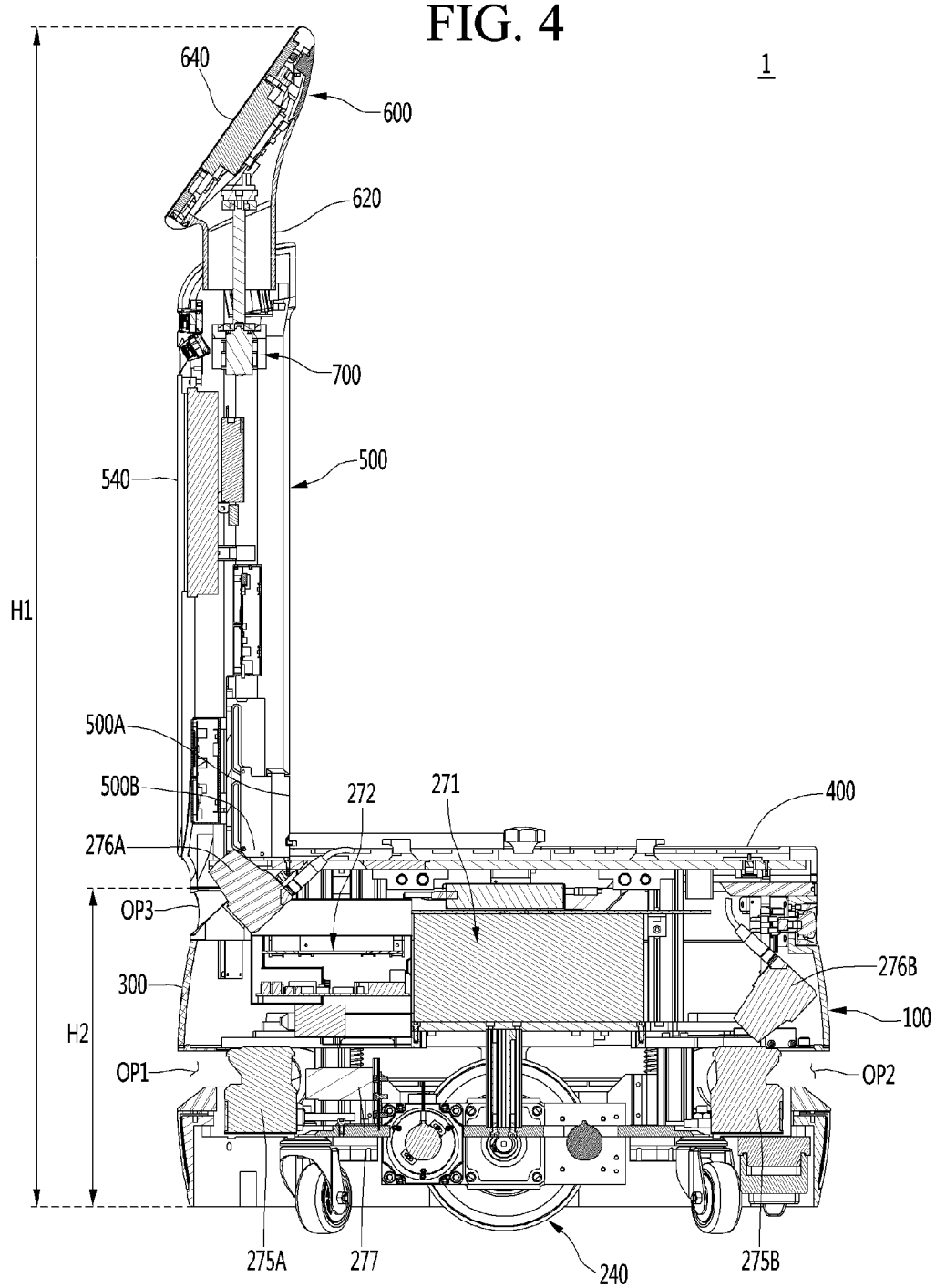
FIG. 4 is a cross-sectional view taken along line A-A' shown in FIG. 2.

FIG. 4 is a sectional view taken along line A-A' of FIG. 1.

A battery 271 and a control box 272 may be mounted in the body 100.

The battery 271 may store a power for operating the moving module 1.

The battery 271 may be supported by the upper plate 220 of the inner module 200. The battery 271 may be disposed between the upper plate 220 and the top plate 230.

The battery 271 may be disposed inside the body 100 while being biased rearward.

Meanwhile, the display units 500 and 600 may be supported by the top plate 230 of the inner module 200. The display units 500 and 600 may be disposed on an upper front side of the top plate 230. The body display unit 400 may not overlap the battery 271 in the vertical direction.

With the above configuration, a load of the battery 271 may be balanced with loads of the body display unit 500 and the head display unit 600. Accordingly, the moving module 1 may be prevented from tilting forward or rearward or from being overturned.

The control box 272 may be disposed on a front side of the battery 271. The control box 272 may be supported by the upper plate 220 of the inner module 200. The control box 272 may be disposed between the upper plate 220 and the top plate 230. At least a part of the control box 272 may vertically overlap the display units 500 and 600.

The control box 272 may include a boxing case having a box shape and a controller provided inside the boxing case. The boxing case may have a plurality of through-holes to dissipate heat inside the control box 272. The controller may include a PCB, and may control an overall operation of the moving module 1.

Since the control box 272 is disposed on the front side of the battery 271, the load of the battery 271 which is biased rearward may be balanced with a load of the control box 272. Accordingly, the moving module 1 may be prevented from tilting forward or rearward or from being overturned.

The body 100 may be provided with at least one radar. The lidar is a sensor capable of detecting a distance to an object and various physical properties by projecting a laser onto a target.

The body 100 may be provided with a front lidar 275A and a rear lidar 275B, and the front lidar 275A and the rear lidar 275B may detect surrounding objects, geographic features, and the like. The front lidar 275A and the rear lidar 275B may be provided at front and rear portions of the body 100, respectively.

At least a part of the front lidar 275A may be disposed under the control box 272. The front lidar 275A and the rear lidar 275B may be disposed at the same height within the body 100. The front lidar 275A and the rear lidar 275B may be disposed at a position lower than the battery 271 within the body 100.

The front lidar 275A and the rear lidar 275B may be supported by the lower plate 210 of the inner module 200. The front lidar 275A and the rear lidar 275B may be disposed between the lower plate 210 and the upper plate 220. In this case, a space inside the body 100 can be efficiently utilized as compared with a case where the front lidar 275A and the rear lidar 275B are disposed at the same height as the battery 271. Therefore, the body 100 can have a compact size.

The controller of the control box 272 may receive information detected by the front lidar 275A and the rear lidar 275B, and may perform 3D mapping based on the information or control the traveling unit 240 so that the moving module 1 may evade an obstacle.

The housing 300 may be formed at a front portion thereof with a front open portion OP1. The front open portion OP1 may be opened toward the front side. The front open portion OP1 may extend in the circumferential direction of the housing 300. The front lidar 275A may detect information on a front region of the moving module 1 through the front open portion OP1 formed in the front portion of the body 100. The front lidar 275A may detect an obstacle or the like located on a front side of the moving module 1 through the front open portion OP1 or may perform mapping on the front region of the moving module 1.

The housing 300 may be formed at a rear portion thereof with a rear open portion OP2. The rear open portion OP2 may be opened toward a rear side. The rear open portion OP2 may extend in the circumferential direction of the housing 300. The rear lidar 275B may detect information on a rear region of the moving module 1 through the rear open portion OP2 formed in the rear portion of the body 100. The rear lidar 275B may detect an obstacle or the like located on a rear side of the moving module 1 through the rear open portion OP2 or may perform the mapping on the rear region of the moving module 1.

In addition, the body 100 may be provided with at least one cliff sensor. The cliff sensor may detect a state of a ground surface and presence of a cliff through transmission and reception of infrared rays. The body 100 may be provided with a front cliff sensor 276A and a back cliff sensor 276B.

The front cliff sensor 276A and the back cliff sensor 276B may detect the state of the ground surface and the presence of the cliff on the front and rear regions of the moving module 1.

The controller of the control box 272 may receive information detected by the front cliff sensor 276A and the back cliff sensor 276B, and may control the traveling unit 240 so that the moving module 1 may evade the cliff.

The front cliff sensor 276A may be disposed above the front lidar 275A. The back cliff sensor 276B may be disposed above the rear lidar 276B.

The front cliff sensor 276A and the back cliff sensor 276B may be suspended from the top plate 230 of the inner module 200 so as to be supported by the top plate 230 of the inner module 200. The front cliff sensor 276A and the back cliff sensor 276B may be disposed between the upper plate 220 and the top plate 230.

At least a part of the front cliff sensor 276A may be disposed above the control box 272. The back cliff sensor 276B may be disposed on a rear side of the battery 271.

In other words, the front cliff sensor 276A may be disposed at a position higher than the back cliff sensor 276B within the body 100.

Accordingly, a space inside the body 100 can be effectively utilized as compared with a case where the front cliff sensor 276A is disposed on a front side of the control box 272. Therefore, the body 100 can be made in a compact size in the front-rear direction.

The housing 300 may be formed at the front portion thereof with an upper open portion OP3. The upper open portion may be formed above the front open portion OP1. The upper open portion OP3 may be opened toward the front side or a lower front side. The front cliff sensor 276A may detect the state of the ground surface on the front side of the moving module 1 through the upper open portion OP3.

The back cliff sensor 276B may detect the state of the ground surface on the rear side of the moving module 1 through the rear open portion OP2.

A wiring shutoff switch 277 may be mounted in the body 100. The wiring shutoff switch 277 may immediately stop the driving of the moving module 1 by shutting off the power of the moving module 1.

The wiring shutoff switch 277 may be disposed on a rear side of the front lidar 275A. The wiring shutoff switch 277 may be supported by the lower plate 210 of the inner module 200.

Meanwhile, a height H1 of upper ends of the display units 500 and 600 may be higher than a height H2 of an upper end of the body 100.

The display units 500 and 600 may have at least one opening through which a cable may pass.

The body display unit 500 may be formed in a rear surface thereof with a rear opening 530A. The rear opening 530A may be formed in a lower rear surface of the body display unit 500.

The body display unit 500 may be formed in a lower portion thereof with a lower opening 500B. The lower opening 500B may be formed by opening a bottom surface of the body display unit 500. The cable connected to the display unit 500 may extend into the body 100 through the lower opening 500B, and may be connected to the control box 272.

The cable connected to the serving module M may extend into the body display unit 500 through the rear opening 530A, may extend into the body 100 through the lower opening 500B, and may be connected to the control box 272.

Figure 5:
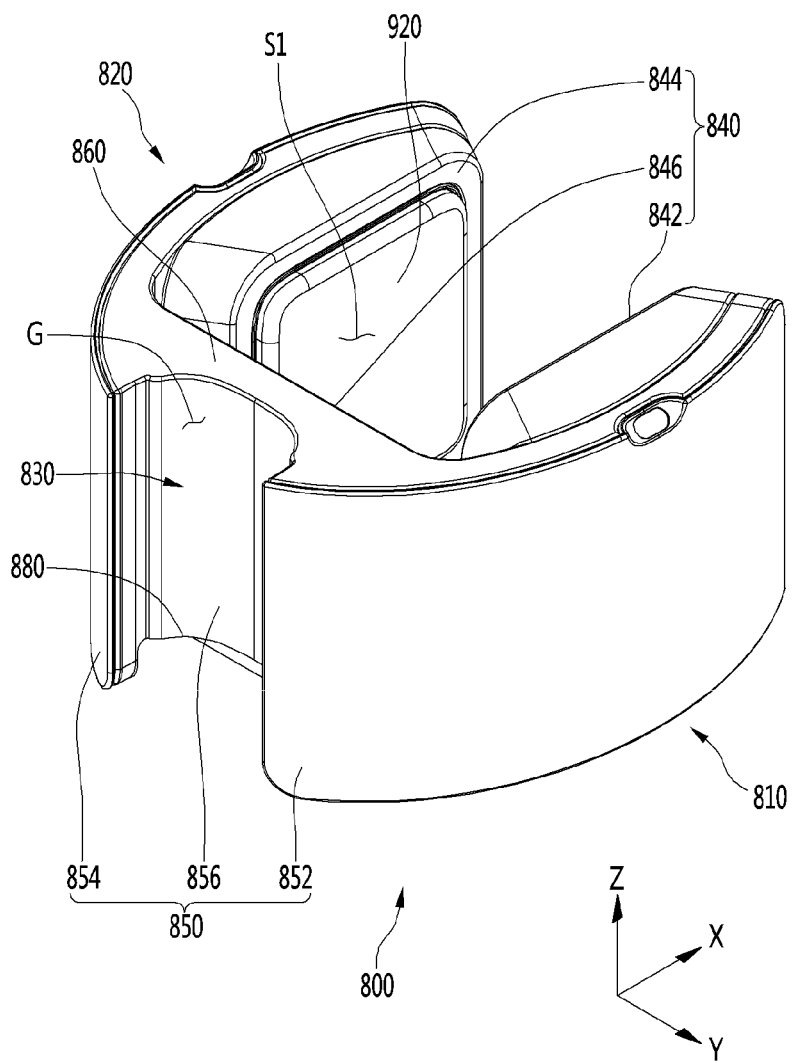
FIG. 5 is a perspective view of a porter module according to an embodiment of the present invention.
Figure 6:
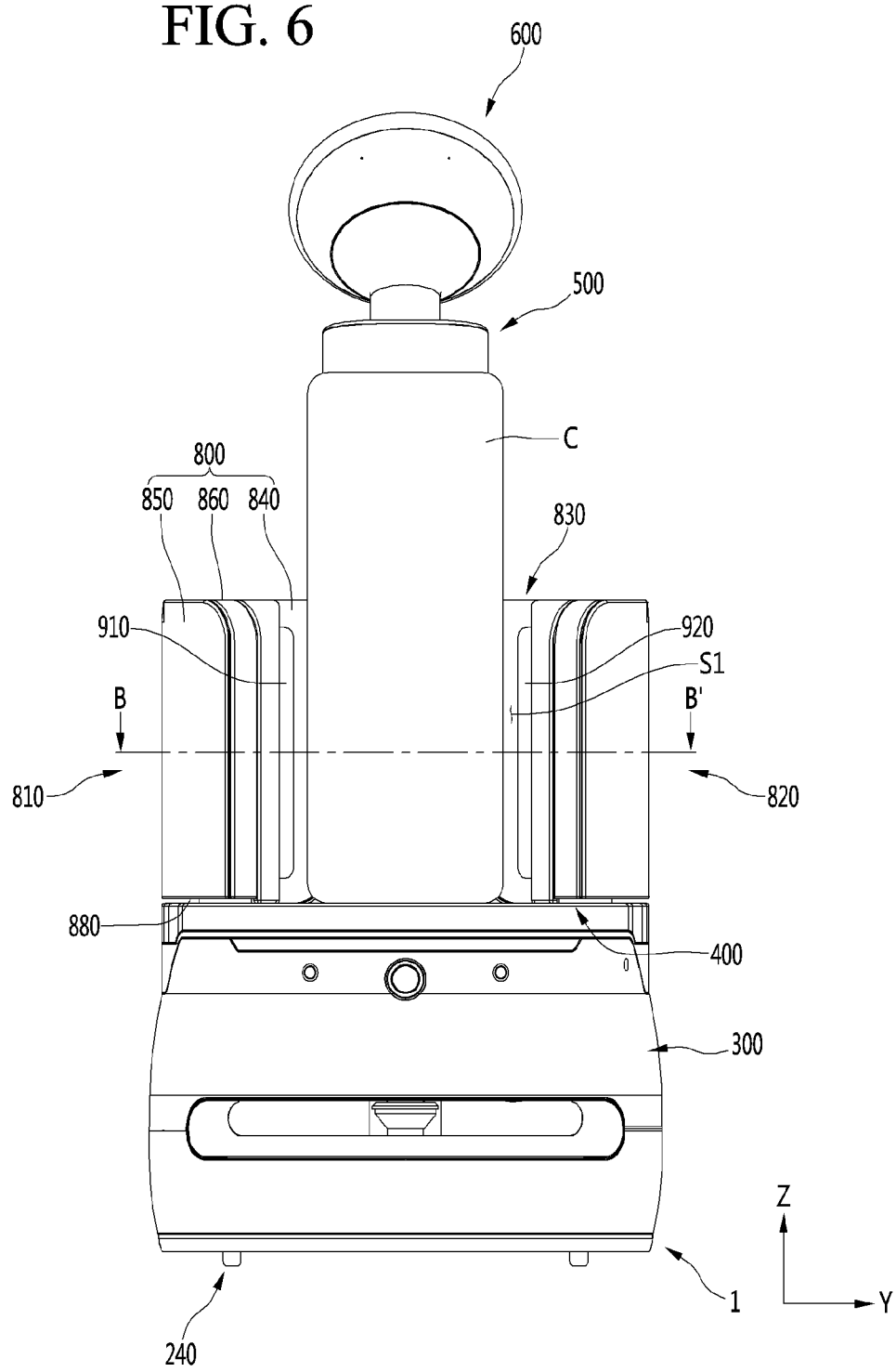
FIG. 6 is a rear view when baggage is seated on a robot according to an embodiment of the present invention.
Figure 7:
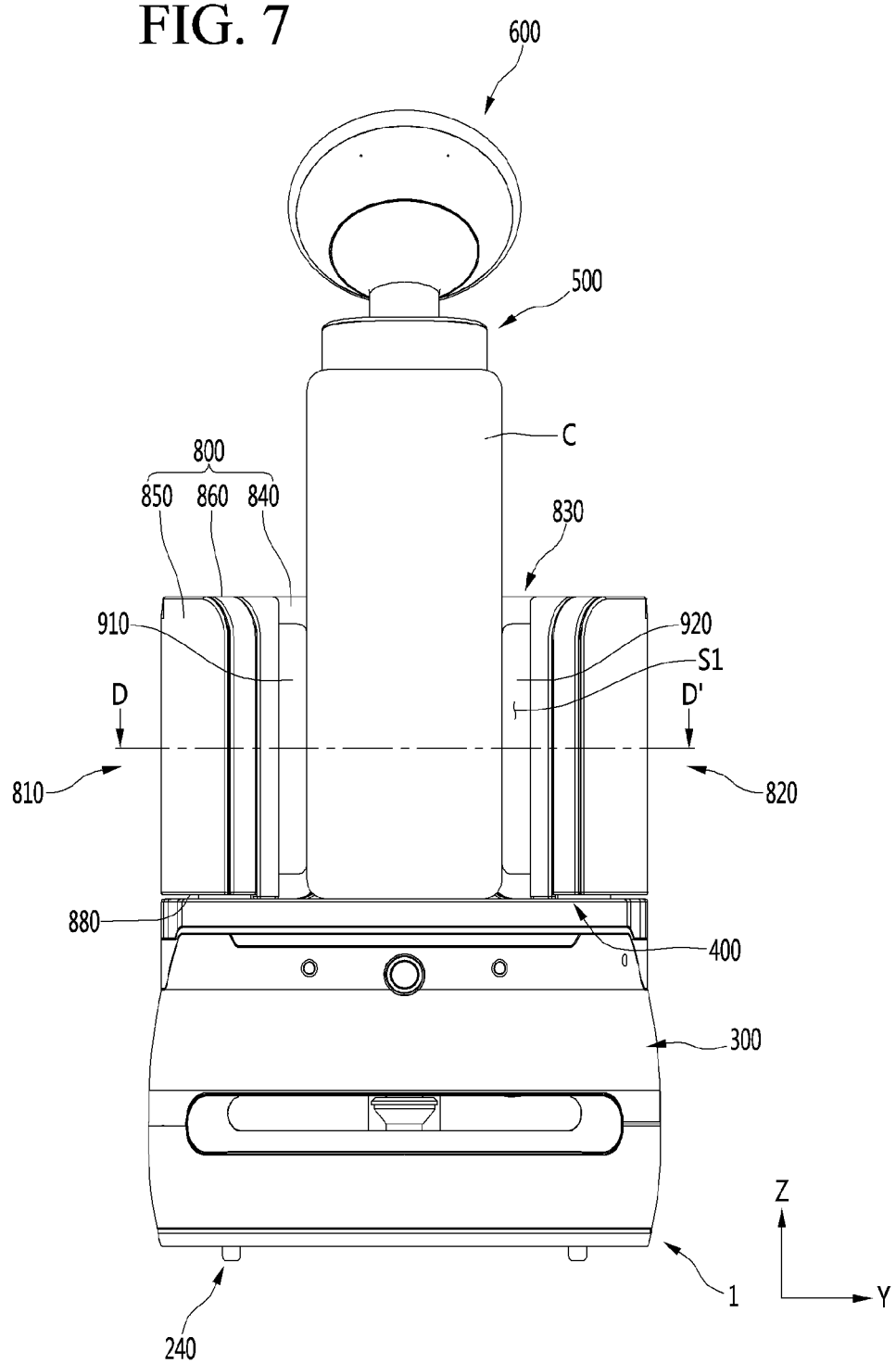
FIG. 7 is a rear view when baggage is fixed by a porter module according to an embodiment of the present invention.
Figure 8:
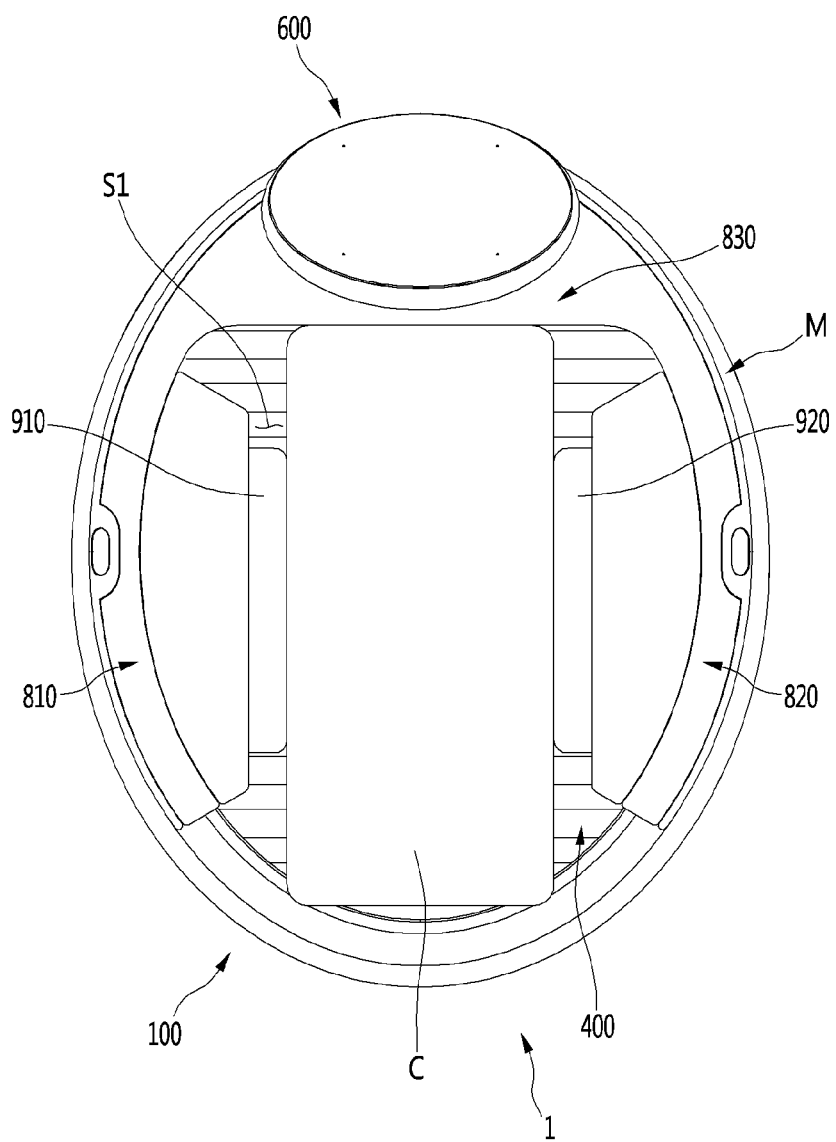
FIG. 8 is a plan view when baggage is fixed to a porter module according to an embodiment of the present invention.
Figure 9:
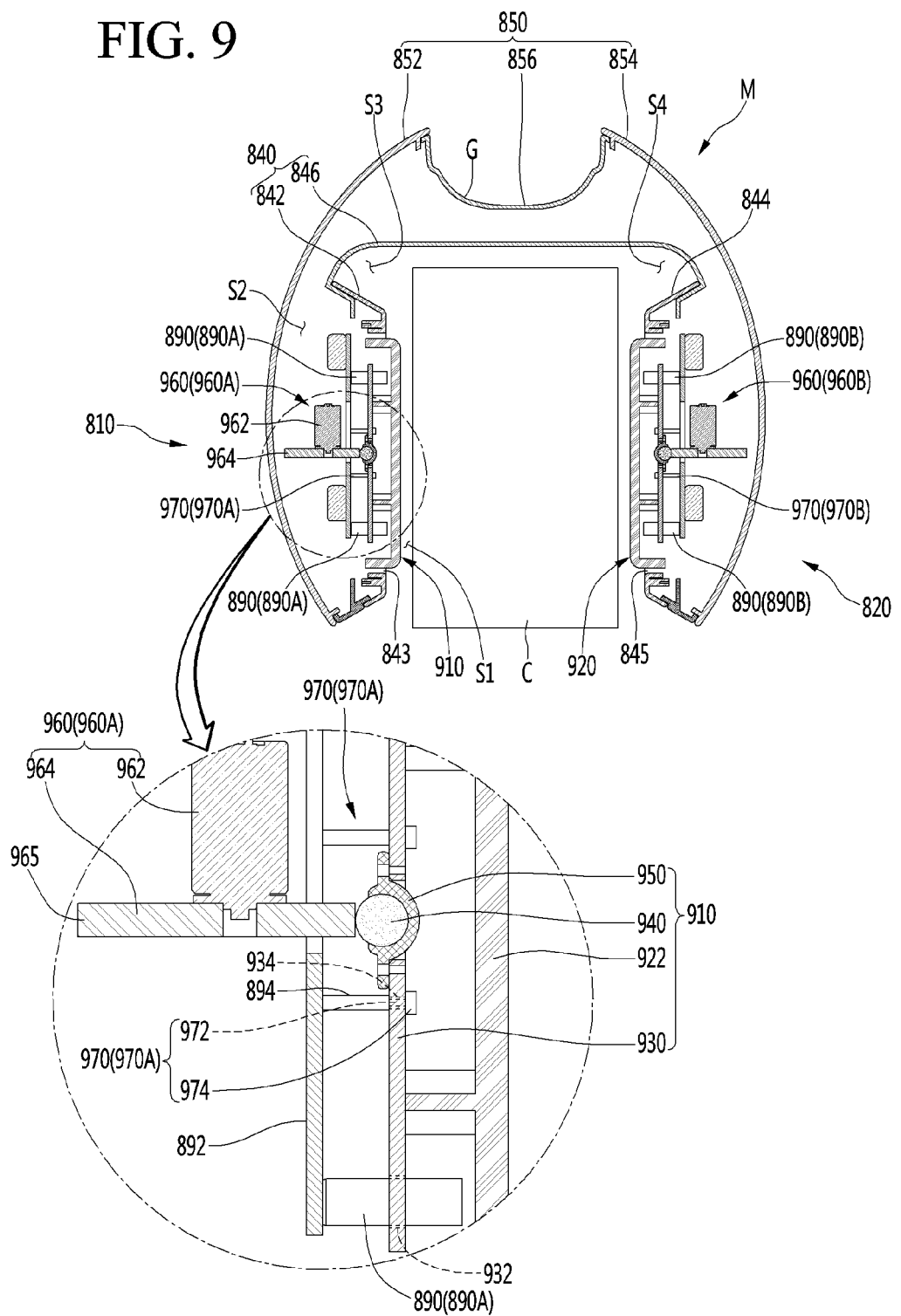
FIG. 9 is a cross-sectional view take along line B-B' shown in FIG. 6.
Figure 10:
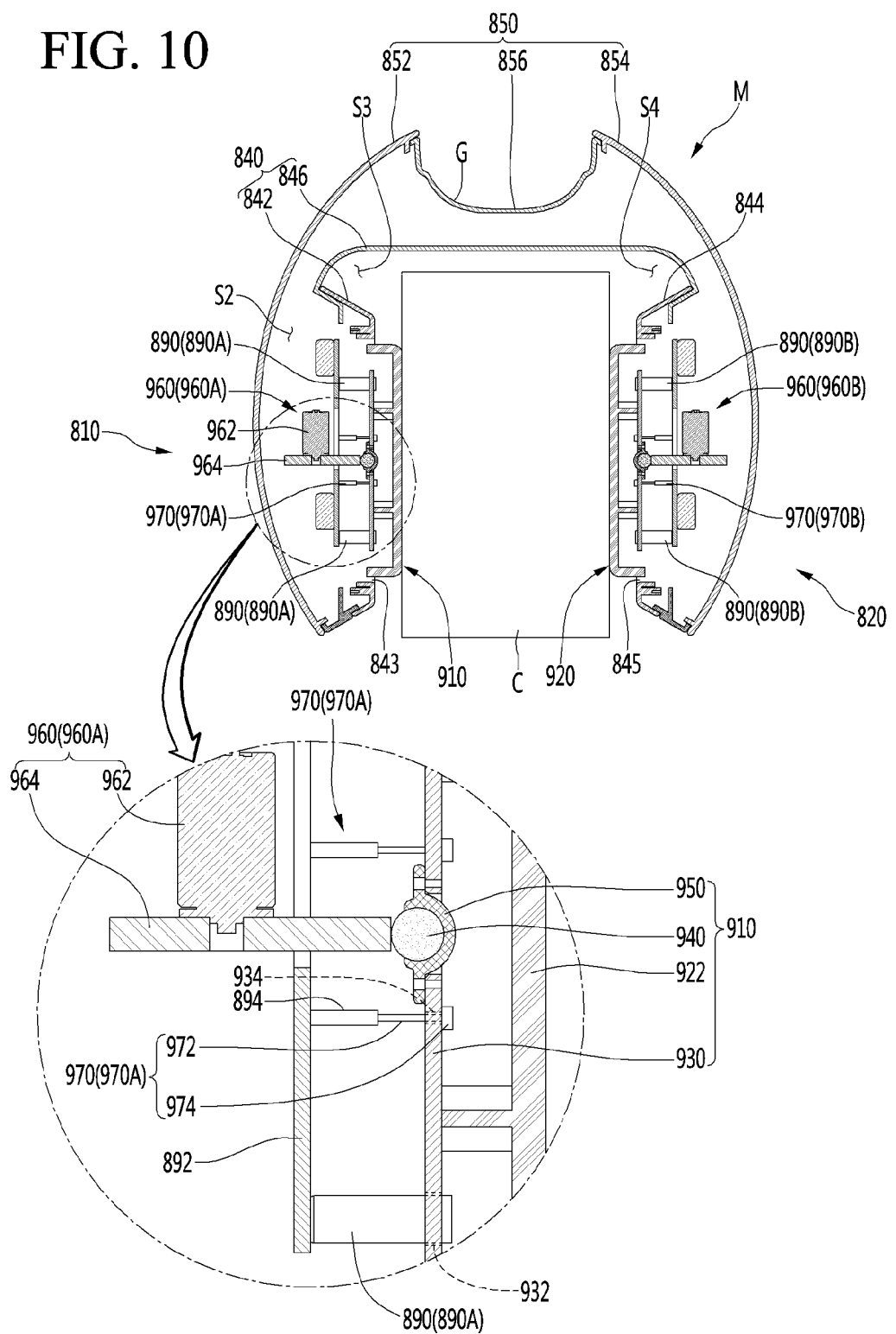
FIG. 10 is a cross-sectional view take along line D-D' shown in FIG. 7.

FIG. 5 is a perspective view illustrating a porter module according to an embodiment of the present invention, FIG. 6 is a rear view when baggage is seated on a robot according to an embodiment of the present invention, FIG. 7 is a rear view when baggage is fixed by a porter module according to the present invention, FIG. 8 is a plan view when baggage is fixed to a porter module according to the embodiment of the present invention, FIG. 9 is a cross-sectional view taken along line B-B' shown in FIG. 6, and FIG. 10 is a cross-sectional view taken along line D-D' shown in FIG. 7.

The porter module M may include a main body 800, a left pressing body 910, and a right pressing body 920.

The main body 800 may form an appearance of the porter module M.

The main body 800 may have a space S1 formed to accommodate at least a portion of baggage C, and the space S1 may be a baggage accommodation space.

The space S1 may be formed so that an upper surface and a rear surface thereof are open inside the main body 800, and the space S1 of the main body 800 may be an open space formed such that each of the upper surface and the rear surface are open.

The main body 800 may include a left body 810 and a right body 820 spaced apart from each other in a left-right direction Y.

The space S1 in which the baggage C may be accommodated may be a space formed between the left body 810 and the right body 820. The baggage C may be fixed by the left pressing body 910 and the right pressing body 920 in the space S1 between the left body 810 and the right body 820.

The main body 800 may further include at least one connecting body connecting the left body 810 and the right body 820.

The connecting body may be at least one of a front body 830 and a rear body. The front body 830 may be formed to connect a front portion of the left body 810 and a front portion of the right body 820.

The rear body may be formed to connect a rear portion of the left body 810 and a rear portion of the right body 820.

The space S1 may be open in at least one direction (e.g., Z direction and/or X direction). The space S1 may be open in an upward direction. Also, the space S1 may be open in a rearward direction. When the space S1 is open in the rearward direction, the main body 800 may be configured without the rear body. When the space S1 is open in both upward and backward directions, the baggage C may enter and exit the space S1 at a rear position or an upper position of the space S1.

When the porter module M is mounted on the moving module 1, the baggage C may be seated on the moving module 1 or the porter module M.

When the baggage C is seated on the moving module 1, the space S1 may be open in a downward direction.

Meanwhile, when the baggage C is seated on the porter module (M), the main body 800 may further include a lower body on which the baggage C is seated. When the main body M further includes the lower body, the lower body may be formed to connect a lower portion of the left body 810 and a lower portion of the right body 820 and the baggage C may be mounted on an upper surface of the lower body.

If the main body 800 does not include a lower body, the space S1 may be a space which is open in each of the upward direction, the backward direction, and the downward direction.

The front body 830 may be located in front of the space S1, and the baggage C may be constrained to the front body 830 and may not be arbitrarily removed in the forward direction.

The front body 830 may have a depression G that may be combined with a portion of the moving module 1. When the porter module M is seated on the moving module 1, a portion of the front body 830 may overlap a body display unit 500 in the front-rear direction, and the front body 830 may have the depression G surrounding a portion of an outer circumferential surface of the body display unit 500.

Hereinafter, an example in which the main body 800 includes the left body 810, the right body 820, and the front body 830 will be described.

The main body 800 may cover an adjusting mechanism 960 such that the adjusting mechanism 960 to be described later is not exposed to the outside. The adjusting mechanism 960 may be accommodated in an adjusting mechanism accommodation space S2 (see FIGS. 9 and 10) formed in the main body 800.

The main body 800 may be configured as a combination of a plurality of members.

The main body 800 may include an inner cover 840 and an outer cover 850. The adjusting mechanism accommodation space S2 in which the adjusting mechanism 960 is accommodated may be formed between the inner cover 840 and the outer cover 850.

The main body 800 may further include a top cover 860 connecting an upper portion of the inner cover 840 and an upper portion of the outer cover 850.

The main body 800 may further include a bottom cover 880 connecting a lower portion of the inner cover 840 and a lower portion of the outer cover 850.

The inner cover 840 may form a space S1 in which the baggage C is accommodated. The inner cover 840 may form an inner circumferential surface of the main body 800.

The main body 800 may have a space S1 in which the baggage C is accommodated in the inner cover 840, and the accommodation space S2 in which the adjusting mechanism 960 is accommodated may be formed outside the inner cover 840.

The left pressing body 910 and the right pressing body 920 may be movably disposed on the inner cover 840.

The left pressing body 910 and the right pressing body 920 may be spaced apart from each other in the left-right direction Y on the inner cover 840, and each of the left pressing body 910 and the right pressing body 920 may be disposed on the inner cover 840 so as to be movable in left-right direction Y.

The inner cover 840 may have a left opening 843 through which the left pressing body 910 penetrates. In addition, the inner cover 840 may have a right opening 845 through which the right pressing body 920 penetrates. The left opening 843 and the right opening 845 may be formed to be open in the left-right direction Y in the inner cover 840. The left opening 843 and the right opening 845 may be formed to face each other in the left-right direction Y.

The left pressing body 910 and the right pressing body 920 may be disposed to face each other in the main body 800. The right side of the left pressing body 910 and the left side of the right pressing body 920 may face each other in the left-right direction.

The inner cover 840 may include a left inner cover 842 in which the left opening 843 is formed and a right inner cover 844 in which the right opening 845 is formed.

The left inner cover 842 and the right inner cover 844 may be spaced apart from each other in the left-right direction Y and may face each other.

The inner cover 840 may further include a front inner cover 846 connected to the left inner cover 842 and the right inner cover 844.

The left inner cover 842 may include a center plate in which the left opening 843 is formed, a front plate extending from a front end of the center plate so as to be in contact with the front inner cover 846, and a rear plate extending from a rear end of the center plate so as to be in contact with a left outer body 852.

The rear plate of the left inner cover 842 may form a rear appearance of the left body 810.

The right inner cover 844 may be configured to be symmetrical with the left inner cover 842 and may include a center plate in which the right opening 845 is formed, a front plate extending from a front end of the center plate so as to be in contact with the front inner cover 846, and a rear plate extending from a rear end of the center plate so as to be in contact with a right outer body 854.

The rear plate of the right inner cover 844 may form a rear appearance of the right body 820.

A length of the front inner cover 846 in the left-right direction may be longer than a length of a gap in the left-right direction formed between the left inner cover 842 and the right inner cover 844.

A left gap S3 may be formed between a rear surface of the front inner cover 846 and the front plate of the left inner cover 842.

A right gap S4 may be formed between a rear surface of the front inner cover 846 and a front plate of the right inner cover 844.

The outer cover 850 may be larger than the inner cover 840. The outer cover 850 may surround the inner cover 840 on the outer side of the inner cover 840. The outer cover 850 may be disposed to surround an outer circumferential surface of the inner cover 840. The outer cover 850 may form an outer circumferential surface of the main body 800.

The outer cover 850 may be a combination of a plurality of members.

The outer cover 850 may include a left outer cover 852 covering a left adjusting mechanism 960A described later and a right outer cover 854 covering a right adjusting mechanism 960B described later.

The outer cover 850 may further include a front outer cover 856 having a depression G formed therein.

The left outer cover 852, the left inner cover 842, a left portion of the top cover 860, and a left portion of the bottom cover 880 may configure the left body 810 of the main body 800. The left outer cover 852 may be detachably connected in the leftward direction, and the left adjusting mechanism 960A may be easily serviced in a state where the left outer cover 852 is separated.

The right outer cover 854, the right inner cover 844, a right portion of the top cover 860, and a right portion of the bottom cover 880 may configure the right body 820 of the main body 800.

The right outer cover 854 may be detachably connected in the rightward and the right adjusting mechanism 960B may be easily serviced in a state where the right outer cover 854 is separated.

The front outer cover 856 may be formed between the top cover 860 and the bottom cover 880. The front outer cover 856 may be positioned in front of the front inner cover 846. The front outer cover 856 and the front inner cover 846 may be spaced apart from each other in the front-rear direction X.

When viewed from the side of the porter module M, the left pressing body 910, the right pressing body 920, and the adjusting mechanism 960 may be covered by the outer cover 850 and may not be visible.

The porter module M may include the adjusting mechanism 960 for operating at least one of the left and right pressing bodies 910 and 920.

The adjusting mechanism 960 may be installed in the main body 800.

An example of the adjusting mechanism 960 may adjust an interval between the left pressing body 910 and the right pressing body 920 by moving at least one of the left and right pressing bodies 910 and 920.

In this case, at least one of the left pressing body 910 and the right pressing body 920 may be movably disposed in the main body 800, and the adjusting mechanism 960 may be a mechanism linearly moving a pressing body disposed in the main body 800 among the left pressing body 910 and the left pressing body 910. In this case, the left pressing body 910 and the right pressing body 920 may be rigid bodies.

Another example of the adjusting mechanism 960 may adjust an interval between the left pressing body 910 and the right pressing body 920 by inflating or contracting at least one of the left and right pressing bodies 910 and 920.

In this case, at least one of the left pressing body 910 and the right pressing body 920 may be configured to be varied in volume. For example, at least one of the left pressing body 910 and the right pressing body 920 may be configured as a pressing bag which may be inflated by a gas such as air or the like.

the pressurizing bag 910, which may be expanded by gas such as air. The adjusting mechanism 960 may be configured as an inflator inflating the pressure bag by injecting a gas such as air into the pressing bag.

In a case where at least one of the left pressing body 910 and the right pressing body 920 is configured as a pressing bag which may be inflated or contracted and the adjusting mechanism 960 is configured as an inflator injecting a gas into the pressing bag, if a weight of the baggage C is light, the baggage C may be stably fixed. Meanwhile, in a case where the weight of the baggage C is heavy and the porter module M is moved, a possibility that the baggage C wobbles or is inclined to the side between the left pressing body 910 and the right pressing body 920 may be high. In a case where a gas in such a pressing bag is discharged, it may be difficult for the pressing bag to be briefly arranged.

In order to ensure reliable fixing of the heavy baggage C and in consideration of an appearance when the baggage C is not fixed, each of the left pressing body 910 and the right pressing body 920 is preferably formed of a rigid body and the adjusting mechanism 960 preferably linearly moves at least one of the left and right pressing bodies 910 and 920.

Hereinafter, an example in which the adjusting mechanism 960 fixes the baggage C by moving at least one of the left and right pressing bodies 910 and 920 will be described in detail.

It may be possible for only one of the left pressing body 910 and the right pressing body 920 to be movably disposed and the other to be fixed in position.

Meanwhile, it may also be possible for each of the left pressing body 910 and the right pressing body 920 to be movably disposed.

In the case where each of the left pressing body 90 and the right pressing body 920 is movably disposed, a maximum movable distance of the left pressing body 90 and the right pressing body 920 may be minimized and the baggage C may be fixed to the center as possible in the space S1, as compared with the case where only one of the left pressing body 90 and the right pressing body 920 is movably disposed. It is preferable that each of the left pressing body 910 and the right pressing body 920 is movably disposed.

Hereinafter, an example in which each of the left pressing body 910 and the right pressing body 920 is movably disposed in the main body 800 will be described. However, the present invention is not limited to the case where each of the left pressing body 910 and the right pressing body 920 is movably disposed in the main body 800, and only one of the left pressing body 910 and the right pressing body 920 may be movably disposed while the other may be fixed in position.

The left pressing body 910 may be disposed to be movable in the left-right direction on the left body 810 and the left pressing body 910 may be disposed on the left body 810 and advance (i.e., move forward) in a direction toward the right pressing body 920 or retreat (i.e., move backward) in a direction away from the right pressing body 920.

The adjusting mechanism 960 may include a motor 962 installed on the main body 800 and a cam 964 connected to the motor 962.

The cam 964 may be directly connected to a rotary shaft of the motor 962 or may be connected to the rotary shaft of the motor 962 through at least one power transmission member.

The cam 964 may be a plane cam having a plate shape, and the cam 964 may have a nose 965 formed on one side thereof. When the nose 965 is in contact with the left pressing body 910 or the right pressing body 920, the cap 964 may cause the left pressing body 910 or the right pressing body 920 to advance toward the baggage C, and in a state where the left pressing body 910 or the right pressing body 920 is in contact with the baggage C, the left pressing body 910 or the right pressing body 920 may press the baggage C.

The main body 800 may have a guide rod 890. The guide rod 890 may guide the left pressing body 910 or the right pressing body 920 to be linearly moved in the left-right direction.

An inner supporter 892 may be provided inside the main body 800, and the guide rod 890 may protrude from the inner supporter 892. The guide rod 890 may guide the left pressing body 910 or the right pressing body 92 to be stably linearly moved.

When each of the left pressing body 910 and the right pressing body 920 is disposed to be linearly movable in the main body 800, a plurality of guide rods 890 may be provided in the main body 800.

In this case, the guide rod 890 may be provided at each of the left body 810 and the right body 820. The left body 810 may be provided with a left guide rod 890A and the right body 820 may be provided with a right guide rod 890B. The left guide rod 890A and the right guide rod 890B may be horizontally symmetrical, and hereinafter, a common structure will be referred to as the guide rod 890.

A left guide hole guided along the left guide rod 890A may be formed in the left pressing body 910. A right guide hole guided along the right guide rod 890B may be formed in the right pressing body 820. The left guide hole and the right guide hole may be horizontally symmetrical, and hereinafter, a common configuration will be referred to as the guide hole 932.

At least one of the left pressing body 910 and the right pressing body 920 may include an outer contactor 922, an inner body 930, a ball 940, and a ball housing 950.

The outer contactor 922, as a component in contact with the baggage C between the left pressing body 910 and the right pressing body 920, may substantially be a pressing plate pressing the baggage C.

The inner body 930 may be coupled to the outer contactor 922. The inner body 930 may be smaller than the outer contactor 922. The inner body 930 may be integrally moved with the outer contactor 922 and may be a carrier for substantially linearly moving the outer contactor 922.

The inner body 930 may have a guide hole 932 guided along the guide rod 890.

The ball 940 may be disposed to be in contact with the cam 964. The ball 940 may be rotatably accommodated in the ball housing 950. The ball 940 may be formed of a material having high strength for durability and wear resistance and may be formed of a metal such as steel or SUS.

The ball housing 950 may be coupled to the inner body 930. The ball housing 950 may have a ball accommodating space for accommodating the ball 940. The ball housing 950 may accommodate the ball 940 such that the ball 940 slides, and may be provided such that the inner body 930 is not damaged by the ball 940.

In a case where the left pressing body 910 and the right pressing body 920 do not include the ball 940 and the ball housing 950, the cam 964 may be in contact with the inner body 930 and press the inner body 930. In this case, since the inner body 930 is in direct contact with the cam 964, the inner body 930 may be worn and damaged by the cam 964, and the ball 940 and the ball housing 950 may be components installed to minimize damage to the inner body 930 to increase life.

In the present embodiment, the left pressing body 910 or the right pressing body 920 is not limited to including the ball 930 and the ball housing 940, and the cam 964 may be in direct contact with the inner body 930.

The adjusting mechanism 960 may be provided for each of the left pressing body 910 and the right pressing body 920, and the porter module M may include a left adjusting mechanism 960A and a right adjusting mechanism 960B.

The left adjusting mechanism 960A may be installed on the left body 810 and move the left pressing body 910 in the left-right direction. The left adjusting mechanism 960A may push the left pressing body 910 in the rightward direction so that the left pressing body 910 may advance toward the right pressing body 920.

The right adjusting mechanism 960B may be installed on the right body 820 and move the right pressing body 920 in the left-right direction. The right adjusting mechanism 960B may push the right pressing body 920 in the leftward direction so that the right pressing body 920 may advance toward the left pressing body 910.

The left adjusting mechanism 960A and the right adjusting mechanism 960B may be disposed to be horizontally symmetrical in the porter module M, and other components, except for a direction (i.e., the rightward direction) in which the left pressing body 910 is pushed and a direction (i.e., the leftward direction) in which the right pressing body 920 is pressed, may be the same. That is, each of the left adjusting mechanism 960A and the right adjusting mechanism 960B may include the motor 962 and the cam 964 connected to the motor 962.

The motor of the left adjusting mechanism 960A may be a left motor, the cam of the left adjusting mechanism 960A may be a left cam, the motor of the right adjusting mechanism 960B may be a right motor, and the cam of the right adjusting mechanism 960B may be a right cam.

Only a different configuration of the left motor and the right motor will be separately described as the left motor and the right motor, and a common configuration thereof will be described as the motor 962.

Also, only a different configuration of the left cam and the right cam will be separately described as the left cam and the right cam, and a common configuration thereof will be described as the cam 964.

Meanwhile, in a case where the porter module M includes both the left adjusting mechanism 960A and the right adjusting mechanism 960B, each of the left pressing body 910 and the right pressing body 920 may further include an outer contactor 922, an inner body 930 coupled to the outer contactor 922, a ball 940 in contact with the cam 964, and a ball housing 950 coupled to the inner body 930 and rotatably accommodating the ball 940.

The adjusting mechanism 960 may further include a puller 970 installed in the main body 800.

The puller 970 may include an elastic member 972.

The elastic member 972 may be elastically stretched and contracted with elasticity in a length direction, such as rubber or a spring.

The puller 970 may further include a stopper 974 connected to the elastic member 972 and caught by the left pressing body 910 or the right pressing body 920.

When an external force applied to the left pressing body 910 or the right pressing body 920 is removed, the puller 970 may pull the left pressing body 910 or the right pressing body 920 to return the left pressing body 910 or the right pressing body 920 to their initial positions.

A through hole 934 through which the elastic member 972 passes may be formed in the inner body 930 of the left pressing body 910 or the right pressing body 920. The stopper 974 may be formed to be larger than the through hole 934 may be connected to a portion of the elastic member 972 which has passed through the through hole 934. The stopper 974 may be located between the inner body 930 and the outer contactor 922 and may be held in a state of being in contact with the inner body 930 by the elastic member 972.

The main body 800 may have an elastic member connector 894 to which one end of the elastic member 972 is connected. The elastic member connector 894 may be spaced apart from the guide rod 890. The elastic member connector 894 may be provided at an inner supporter 892.

The puller 970 may be connected to the left pressing body 910 or the right pressing body 920 to pull either the left pressing body 910 or the right pressing body 920 in a direction away from the other.

In a case where the porter module M includes the left adjusting mechanism 960A and the right adjusting mechanism 960B, the puller 970 may be provided at each of the left pressing body 910 and the right pressing body 920, and the porter module M may include a left puller 970A and a right puller 970B.

The left puller 970A may be installed on the left body 810 and connected to the left pressing body 910 to pull the left pressing body 910 in a direction away from the right pressing body 920.

The left puller 970A may be installed such that the left pressing body 910 is pulled in the leftward direction. The left puller 970A may pull the left pressing body 910 closest to the left adjusting mechanism 960A if no external force is applied to the left pressing body 910.

The right puller 970B may be installed on the right body 820 and connected to the right pressing body 920 to pull the right pressing body 920 in a direction away from the left pressing body 910.

The right puller 970B may be installed such that the right pressing body 920 is pulled in the rightward direction. The right puller 970B may pull the right pressing body 920 closest to the right adjusting mechanism 960B if no external force is applied to the right pressing body 920.

The left puller 970B and the right puller 970B may be disposed to be horizontally symmetrical in the porter module M, and other configurations, except for a direction (i.e., the leftward direction) in which the left pressing body is pulled and a direction (i.e., the rightward direction) in which the right pressing body is pulled, may be the same.

Figure 11:
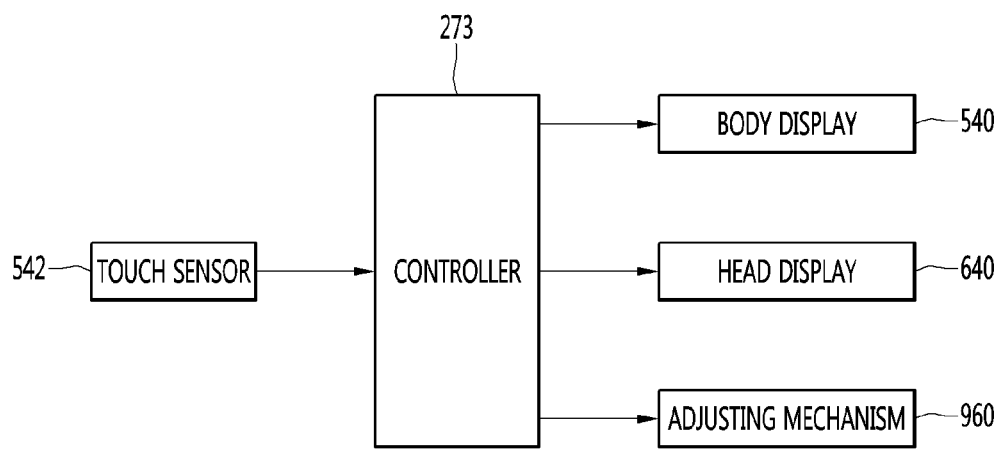
FIG. 11 is a control block diagram of a robot having a porter module according to an embodiment of the present invention.

FIG. 11 is a control block diagram of a robot having a porter module according to an embodiment of the present invention.

A robot having a porter module (hereinafter, referred to as a robot) may include a touch sensor 542, and the controller 273 may control the adjusting mechanism 960 according to a signal transmitted from the touch sensor 542.

The touch sensor 542 may be configured as a touch screen of a display installed in the porter module M or a touch screen of a display installed in the moving module 1.

The user may touch the touch sensor 542 to input a pressing mode or a release mode, and the controller 273 may control the adjusting mechanism 960 to operate in the pressing mode or the release mode according to the signal transmitted from the touch sensor 542.

When the touch sensor 542 is the touch screen of the display installed in the moving module 1, the touch sensor 542 may be a touch screen installed on the body display 540 or a touch screen installed on the head display 640. The user may input the pressing mode or the release mode by touching the body display 540 or touching the head display 640.

The pressing mode may be a mode in which the adjusting mechanism 960 controls the motor 962 of the adjusting mechanism 960 such that the left pressing body 910 and the right pressing body 920 are moved toward each other. The pressing mode may be a mode in which the cam 964 is rotated at an angle at which the nose 965 of the cam 964 is in contact with the ball 940.

The release mode may be a mode in which the motor 962 of the adjusting mechanism 960 is controlled such that the adjusting mechanism 960 does not press the left pressing body 910 and the right pressing body 920. The release mode may be a mode in which the cam 964 is rotated at an angle at which a portion other than the nose 965 of the cam 964 is in contact with the ball 940.

After lifting and placing the baggage C in the space S1, the user may input the pressing mode through the body touch sensor 541, and when the pressing mode is input, the controller 273 may drive the motor 962 of the adjusting mechanism 960 and rotated at an angle at which the nose 965 of the cam 964 is in contact with the ball 940. In the pressing mode, the controller 273 may stop the motor 962 of the adjusting mechanism 960 at an angle at which the nose 965 of the cam 964 is in contact with the ball 940.

In the control of the motor 962 as described above, the left pressing body 910 and the right pressing body 920 press the baggage in a state where the outer contactor 922 is in contact with the side of the baggage, and the baggage may be in close contact with each of the left pressing body 910 and the right pressing body 920 so as to be fixed thereto.

In the state where the baggage C is fixed as described above, the robot may be moved to a destination with the user or may be moved to the destination according to a predetermined program. The baggage C may be moved by the robot in a state of being fixed by the left pressing body 910 and the right pressing body 920.

Meanwhile, it is possible for the robot not to move with the user, in which case someone else other than the user may not easily take out the baggage C from between the left pressing body 910 and the right pressing body 920 until the release mode is input by the user, and the robot may safely carry the baggage C to the destination. That is, the porter module of the present embodiment may minimize a possibility of losing the baggage.

The user may enter the release mode through the touch sensor 542 at the destination.

When the release mode is input by the user, the controller 273 may drive the motor 962 of the adjusting mechanism 960 such that a portion of the cam 964 other than the nose 965 faces the ball 940, and when the cam 964 is at an angle at which the nose 965 of the cam 964 does not fac the ball 940, the controller 273 may stop the motor 962 of the adjusting mechanism 960.

The left pressing body 910 and the right pressing body 920 may be pulled in a direction away from each other by the puller 970, and the left pressing body 910 and the right pressing body 920 may not press the baggage and may not be in contact with the baggage C.

The adjusting mechanism 960 may perform both the pressing mode and the release mode by rotating the cam 964 once in one direction.

The user may easily take out the baggage C which is not pressed by the left pressing body 910 and the right pressing body 920 from the space S1.

Figure 12:
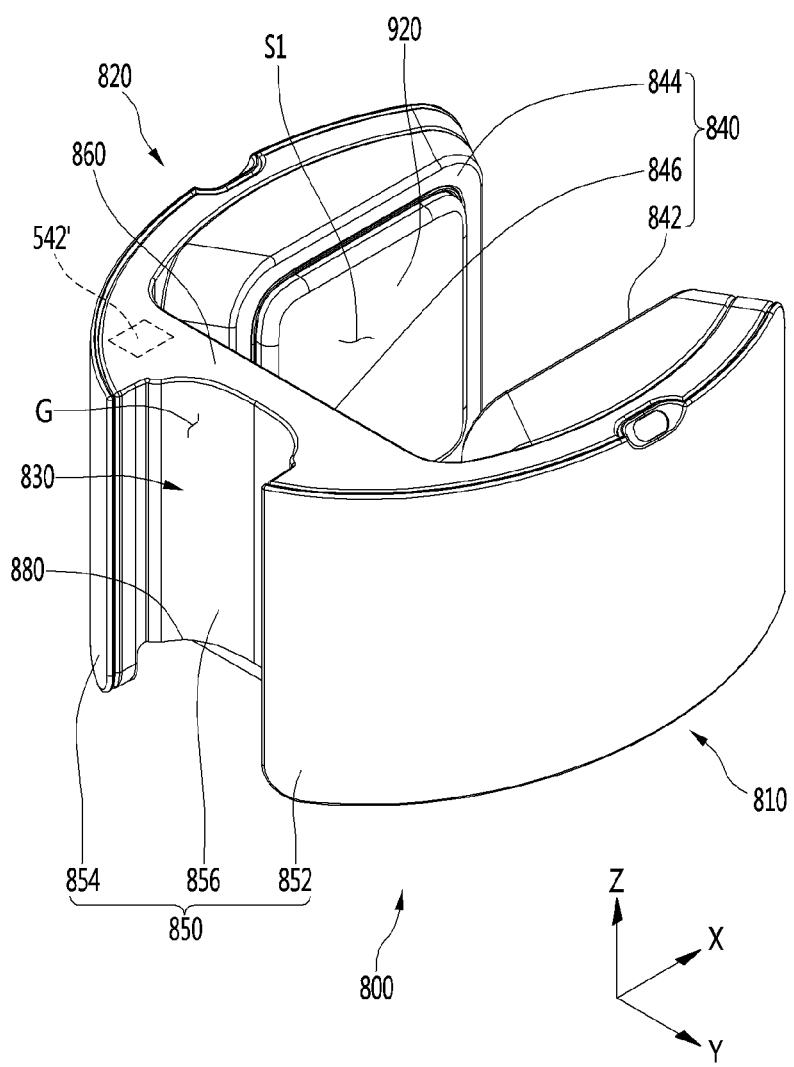
FIG. 12 is a perspective view of a porter module according to another embodiment of the present invention.

FIG. 12 is a perspective view of a porter module according to another embodiment of the present invention.

The touch sensor 542' of the present embodiment may be installed in a portion other than the body display 540 and the head display 640 of the moving module 1 or installed in the main body 800, and the controller 27 may control the adjusting mechanism 960 according to a signal transmitted from the touch sensor 542'.

The touch sensor 542' may be at least one of various types of touch sensors such as a capacitance change type touch sensor, an electric conductivity change type (resistance change type) touch sensor, a light amount change type touch sensor, and the like.

The porter module M may include a porter module display installed in the main body 800, and an example of the touch sensor 542' may be a touch screen installed in the porter module display.

Another example of the touch sensor 542' may be installed at a specific position other than the body display 540 and the head display 640 of the moving module 1 and may be a capacitance change type touch sensor, an electric conductivity change type touch sensor, a light amount change type touch sensor, and the like.

The controller 273 may perform the pressing mode and the release mode by the number of times the user touches the touch sensor 542' or by a touch pattern of touching the touch sensor 542'.

For example, when the user touches the touch sensor 542' for a first predetermined number of times (e.g., once) in a state where the baggage is accommodated in the space, the controller 273 may start the pressing mode to fix the baggage.

Meanwhile, when the user touches the touch sensor 542' a second predetermined number of times (e.g., twice) in a state where the baggage is fixed to the left pressing body 810 and the right pressing body 82, the controller 273 may start the release mode to release the fixed baggage. The first predetermined number of times and the second predetermined number of times may be set to the same or different.

Figure 13:
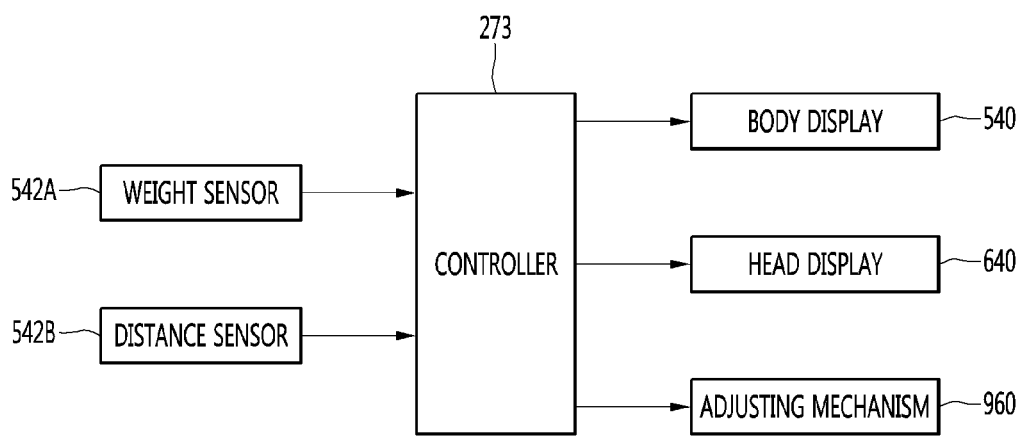
FIG. 13 is a control block diagram of a porter module according to another embodiment of the present invention.

FIG. 13 is a control block diagram of a porter module according to another embodiment of the present invention.

The robot may include at least one sensor and the controller 273.

At least one sensor may sense a baggage C positioned between the left and right pressing bodies 910 and 920, and the controller 273 may control the adjusting mechanism 960 according to a signal transmitted from the at least one sensor.

The robot may include at least one of a weight sensor 542A sensing a weight of the baggage C accommodated in the space S1 and a distance sensor 542B sensing a distance to the baggage C.

The weight sensor 542A or the distance sensor 542B may be a baggage sensor capable of sensing whether the baggage C is accommodated in the space C or a position of the baggage C in the space S1.

The controller 273 may control the adjusting mechanism 960 according to a signal transmitted from the weight sensor 542A or a signal transmitted from the distance sensor 542B.

The weight sensor 542A may be installed in the moving module 1, and may be, for example, a load cell. The weight of the baggage C accommodated in the space S1 may be sensed by the weight sensor 542A and a sensing value sensed by the weight sensor 542A may be transmitted to the controller 273.

In a case where a sensing value sensed by the weight sensor 542A is within the range of the set weight (e.g., 3 kg to 50 kg), the controller 273 may determine that an appropriate baggage is accommodated in the space S1 of the porter module M. When a predetermined time (e.g., 10 seconds) has passed since the weight sensor 542A senses the weight of the baggage, the controller 273 may perform the pressing mode.

Meanwhile, if the sensing value sensed by the weight sensor 542A exceeds an upper limit value (e.g., 50 kg) of the range of the set weight, the controller 273 may not perform the pressing mode to protect the robot having the porter module, or the like and express a transport unsuitability state to the outside through a buzzer, a display, or the like.

The distance sensor 542B may be installed in the moving module 1 or the porter module M and may sense a distance between the baggage and the porter module M, a distance between the baggage and the left pressing body 910, or a distance between the baggage and the right pressing body 920. The distance sensor 542B may be an optical distance sensor irradiating infrared rays or gas rays to the space S1 or baggage C, an ultrasonic sensor generating ultrasonic waves to the space S1 or baggage C, or a proximity sensor sensing proximity of the baggage.

Whether the baggage C is normally accommodated in the space S1 may be sensed by the distance sensor 542B and a sensing value sensed by the distance sensor 542B may be transmitted to the controller 273.

If the sensing value sensed by the distance sensor 542B is within the set range (e.g., 1 cm to 20 cm), the controller 273 may determine that the baggage C is normally accommodated in the space S1. When a preset time (e.g., 10 seconds) has passed since the distance sensor 542B sensed the distance to the baggage C, the controller 273 may perform the pressing mode.

Meanwhile, if the sensing value sensed by the distance sensor 542B exceeds an upper limit value (e.g., 20 cm) of the set range, although each of the left pressing body 910 and the right pressing body 920 advances at the maximum level, the left pressing body 910 and the right pressing body 920 may not come into contact with the baggage C. Therefore, the controller 273 may not perform the pressing mode so that the baggage C is not moved in a state of not being fixed by the left pressing body 910 and the right pressing body 920, and may express the transport unsuitability state through a buzzer, a display, or the like.

An example of the robot may include the weight sensor 542A and the controller 273 and may not include the weight sensor 542B and the adjusting mechanism 960 may be controlled according to a sensing result of the weight sensor 542A.

Another example of a robot includes a distance sensor 542B and a controller 273 but it is possible not to include the weight sensor 542A and the adjusting mechanism 960 may be used to determine the distance between the sensing result of the distance sensor 542B.

Another example of the robot may include the weight sensor 542A, the distance sensor 542B, and the controller 273, and the adjusting mechanism 960 may be controlled according to a sensing result of the weight sensor 542A and a sensing result of the distance sensor 542B. In this case, if the sensing value sensed by the weight sensor 542A is within the range of a set weight (e.g., 3 kg to 50 kg) and it is sensed by the distance sensor 542B that the baggage C is positioned in the space S1, the controller 273 may perform the pressing mode after a predetermined time (e.g., 10 seconds). In a case where the robot includes both the weight sensor 542A and the distance sensor 542B, the baggage C may be carried more reliably and safely.

It will be apparent to those skilled in the art that various modifications and variations may be made in the present invention without departing from the spirit or essential characteristics thereof.

Therefore, the embodiments disclosed in the present invention are not intended to limit the technical idea of the present invention but to describe the present invention, and the scope of the technical idea of the present invention is not limited by these embodiments.

Coverage of the present invention should be construed by the following claims, and all technical ideas falling within the scope of the present invention should be construed as being included in the scope of the present invention.

The invention claimed is:

1. A porter module, comprising:
   a main body having a first body and a second body spaced apart from each other to define a space therebetween;
   a first pressing body located at the first body;

a second pressing body located at the second body and arranged to face the first pressing body; and
an adjuster located in the main body to move at least one of the first pressing body and the second pressing body to adjust an interval between the first pressing body and the second pressing body,
wherein the adjuster further includes a puller located in the main body, the puller being connected to one of the first pressing body and the second pressing body, the puller being configured to pull the one of the first pressing body and the second pressing body away from another of the first pressing body and the second pressing body.

2. The porter module of claim 1, wherein the main body has a guide rod, and
wherein at least one the first pressing body and the second pressing body has a guide hole to receive the guide rod such that the at least one of the first pressing body and the second pressing body is guided along the guide rod.

3. The porter module of claim 1, wherein the main body includes:
an inner cover on which at least one of the first pressing body and the second pressing body is movably disposed;
an outer cover surrounding the inner cover; and
an accommodation space provided between the inner cover and the outer cover to accommodate the adjuster.

4. The porter module of claim 1, further comprising:
an input sensor located at the main body to detect an input;
a controller configured to control the adjuster to move the at least one of the first pressing body and the second pressing body to adjust an interval between the first pressing body and the second pressing body in response to the detected input.

5. The porter module of claim 1, wherein the adjuster includes:
a motor located in the main body; and
a cam arranged to be in contact with the first pressing body, the cam being rotatable by the motor.

6. The porter module of claim 5, wherein the first pressing body includes:
an outer contactor configured to contact an article placed in the space between the first pressing body and the second pressing body;
an inner body coupled to the outer contactor, the inner body being located between the cam and the outer contractor;
a ball in contact with the cam; and
a ball housing coupled to the inner body and rotatably accommodating the ball.

7. The porter module of claim 1, wherein the adjuster includes:
a first adjuster located at the first body to move the first pressing body so that the first pressing body moves toward and away from the second pressing body; and
a second adjuster located at the second body to move the second pressing body so that the second pressing body moves toward and away from the first pressing body.

8. The porter module of claim 7, wherein the main body includes a first guide rod and a second guide rod,
wherein the first pressing body has a first guide hole to receive the first guide rod such that the first pressing body is guided along the first guide rod, and
wherein the second pressing body has a second guide hole to receive the second guide rod such that the second pressing body is guided along the second guide rod.

9. The porter module of claim 7, wherein the puller includes:
a first puller connected to the first pressing body, the first puller being configured to pull the first pressing body in a direction away from the second pressing body; and
a second puller connected to the second pressing body, the second puller being configured to pull the second pressing body in a direction away from the first pressing body.

10. The porter module of claim 7, wherein the main body includes:
a first inner cover having a first opening through which the first pressing body penetrates; and
a second inner cover having a second opening through which the second pressing body penetrates.

11. The porter module of claim 10, wherein the main body includes:
a first outer cover covering the first adjuster; and
a second outer cover covering the second adjuster,
wherein the first adjuster is located between the first pressing body and the first outer cover, and
wherein the second adjuster is located between the second pressing body and the second outer cover.

12. The porter module of claim 7, wherein each of the first adjuster and the second adjuster comprises a motor and a cam connected to the motor.

13. The porter module of claim 12, wherein each of the first pressing body and the second pressing body includes:
an outer contactor; and
an inner body coupled to the outer contactor.

14. The porter module of claim 13, wherein each of the first pressing body and the second pressing body includes:
a ball in contact with the cam; and
a ball housing coupled to the respective inner body so that the ball is rotatably accommodated therein.

15. A robot, comprising:
a porter module, the porter module including:
a main body having a first body and a second body spaced apart from each other to define a space therebetween;
a first pressing body located at the first body;
a second pressing body located at the second body and arranged to face the first pressing body; and
an adjuster located in the main body to move at least one of the first pressing body and the second pressing body to adjust an interval between the first pressing body and the second pressing body;
a mover configured to transport the porter module, the mover including:
a support plate on which the porter module is mounted; and
a display located above the support plate;
a touch sensor at the display; and
a controller configured to control the adjuster according to a signal transmitted from the touch sensor.

16. The robot of claim 15, further comprising at least one sensor to sense an article placed between the first pressing body and the second pressing body,
wherein the controller is configured to control the adjuster according to a signal transmitted from the at least one sensor.

17. The robot of claim 15, further comprising:
a weight sensor to determine a weight of an article accommodated in the space; and
a distance sensor to determine at least one of a distance between the article and the porter module, a distance between the article and the first pressing body, or a distance between the article and the second pressing body, wherein the controller is configured to control the adjuster according to the determined weight of the article and the determined distance.

18. A robot, comprising:

a porter module, the porter module including:
- a main body having a first body and a second body spaced apart from each other to define a space therebetween;
- a first pressing body located at the first body;
- a second pressing body located at the second body and arranged to face the first pressing body; and
- an adjuster located in the main body to move at least one of the first pressing body and the second pressing body to adjust an interval between the first pressing body and the second pressing body;

a mover configured to transport the porter module, the mover including:
- a support plate on which the porter module is mounted; and
- a display located above the support plate;

a touch sensor located at the main body; and a controller configured to control the adjuster according to a signal transmitted from the touch sensor.

* * * * *